United States Patent [19]
Savi

[11] 4,437,398
[45] Mar. 20, 1984

[54] ROTATING-DRUM MACHINE FOR PEELING TOMATOES

[75] Inventor: Antonio Savi, Parma, Italy

[73] Assignee: Officine Meccaniche Savi Antonio S.p.A., Parma, Italy

[21] Appl. No.: 396,453

[22] Filed: Jul. 8, 1982

[30] Foreign Application Priority Data

Sep. 18, 1981 [IT] Italy ............................. 29073/81[U]

[51] Int. Cl.³ ............................................. A23N 7/00
[52] U.S. Cl. ...................................... 99/587; 99/584; 99/593
[58] Field of Search ................. 99/485, 516, 534–536, 99/537–540, 567, 584–589, 593–595; 426/482, 483

[56] References Cited

U.S. PATENT DOCUMENTS 3,853,049 12/1974 Wilkerson .............................. 99/584
4,355,572 10/1982 Silvestrini ......................... 99/584 X

FOREIGN PATENT DOCUMENTS 916338 11/1979 Italy ...................................... 99/584

Primary Examiner—Timothy F. Simone
Attorney, Agent, or Firm—Lowe, King, Price & Becker

[57] ABSTRACT

The machine comprises a lift-conveyor with a lower return-stretch (5) followed in succession by sets of accelerator-chains (7), cutter-device (25), pressure-shoe device (26), bottle-neck exit device (27) and deflector device (22). Sets of channels composed of one fixed (39) and one movable oscillating cheek (20) are arranged in succession about the periphery of the drum (15) and caused thus to rotate. A gulley (40) located between each pair of fixed channel-cheeks provides for discharging peeled tomatoes. Each of the movable channel-cheeks is fitted outermost with a roller (21) designed to pass through the deflector (22) which causes the cheek itself to be drawn toward a fixed magnet (23) and held thereby in the open position until coming against a flexible cam profile (24) which detaches it from said magnet in order to bring about the required squeezing action performed by the channel-cheeks in causing each single tomato to eject from its covering of skin, viz. (28).

6 Claims, 6 Drawing Figures

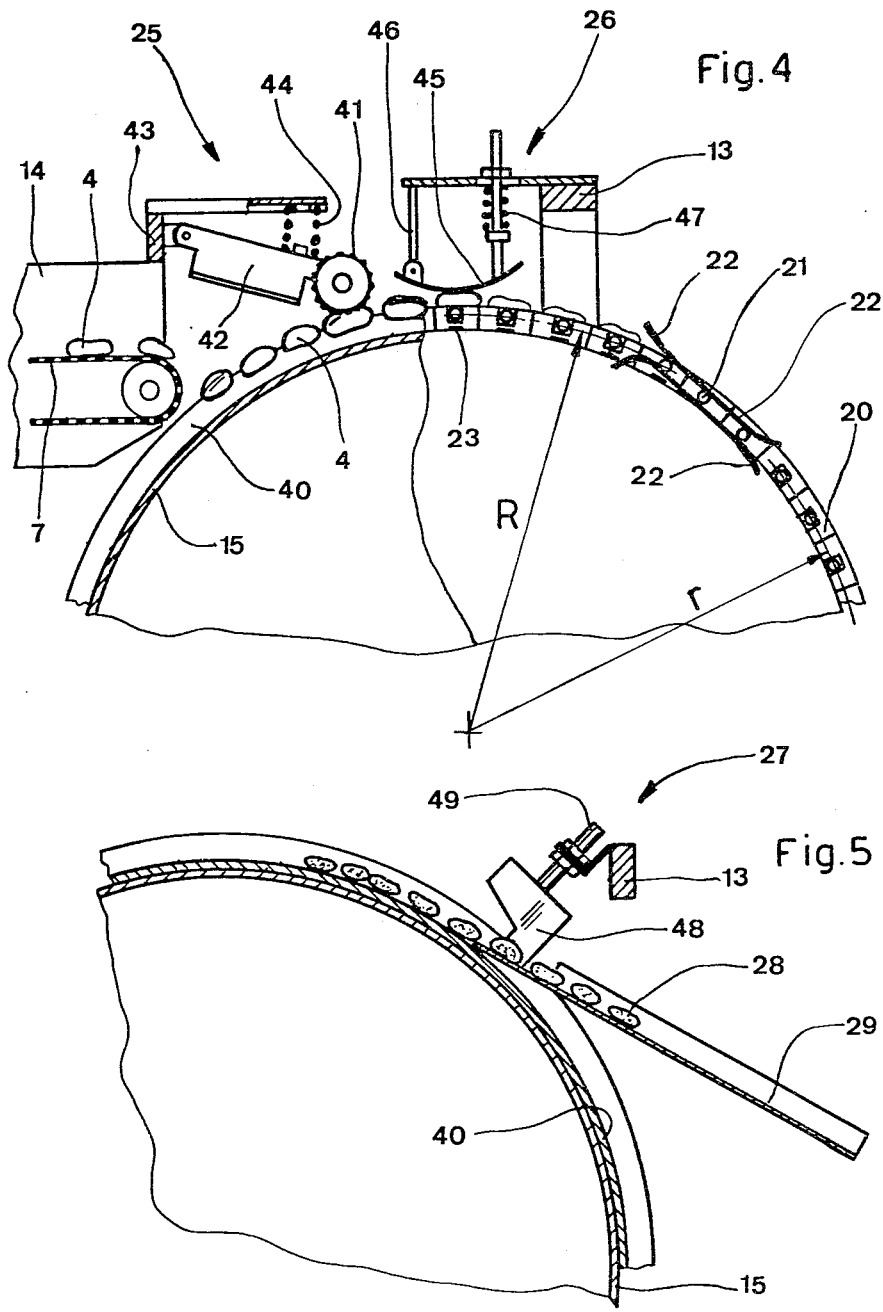

ROTATING-DRUM MACHINE FOR PEELING TOMATOES

The invention relates to a rotating-drum tomato-peeler—that is, a peeling machine for tomatoes incorporating peeling contrivances arranged on a rotating drum.

Amongst peeling machinery representative of the prior art, one has a linear peeler consisting of a series of longitudinally-disposed and parallel channels exhibiting an upwardly-oriented V-type cross-section, mounted to consecutive cross-members of a pair of horizontal conveyor-chains, and given an inner covering of soft rubber, each channel comprising two cheeks—one oscillating and the other fixed. Tomatoes are fed onto the longitudinal series of channels, duly invested with a linear path of movement, and pass under a longitudinally-disposed oscillating element fitted with a tracer wheel whose serrated, or perforator-type cutting edge breaks the skin of the tomato which, being squeezed thereupon within the channel by dint of angular displacement imparted to the latter's oscillating cheek through the agency of a side-on cam, has its pulp expelled smartly from the skin in order to be directed off to one side of the machine for ultimate removal therefrom.

This traditional type of linear multi-channel peeler is set forth in Italian Patent No. 916.338, (property of the same inventor filing the application herewith) which describes the channel and its pair of cheeks, and in Italian Patent No. 970.555, (applied for simultaneously with the former by the same inventor) which covers puncturing of the tomato-skin by means of said rotary tracer and perforator-wheel. Italian Patent No. 916.338 also claims the carrying into effect of such a machine in a rotary embodiment. When carried into effect, in fact, the movable channel-cheek is displaced angularly toward the fixed channel-cheek, against the action of a spring, the tomato-pulp being expelled sideways onto the conveyor cross-members aforesaid which are shaped in such a way as to direct same nicely toward a discharge-point. The infeed system to channels as described in Italian Patent No. 916.338—envisaged from above by means of a series of transversely-disposed spinning taper-rollers converging inwards and forming part of a chain-conveyor—was replaced subsequently by the lift-feeder set forth in Italian Design Patent Application No. 28911 B/80 (in the name of the same inventor as applies herewith), which is equipped with a ladder-type conveyor belt whose topmost stretch drops the tomatoes into a multi-channel dispenser designed to direct same onto a set of accelerator-chains which in their turn deposit the tomatoes by way of respective chutes onto the individual rubber-covered channels.

The prior art thus represented stands in need of further improvement, with regard to the singular desirability of an infeed to the accelerator-chains which reduces the length tomatoes are required to drop—thus giving sure and better distribution thereof; also, in order to ensure that tomato-pulp (particularly from larger tomatoes) does not over- or under-shoot the discharge channel; and lastly, to the end of dispensing with the springs which counteract angular displacement of the movable channel-cheek—this in order to enhance the machine's functional reliability.

The invention arrives at improvements thus outlined with a neater and more streamlined machine incorporating the following features: a lift reducing the drop made by tomatoes therefrom; a multi-channel dispenser directing said tomatoes onto the accelerator-chains; a rotating drum furnished peripherally with a series of successive V-shaped channels, each of which comprises an oscillating or movable cheek and a fixed cheek plus a side-channel down which the tomato-pulp may exit; a cutting device consisting of a revolving tracer-wheel with serrated edge followed in order of succession by a flexible-cam device, a sprung presser-shoe device, a pulp-exit guide device and—as an alternative to the more traditional spring-mechanism—a device dictating the position of individual rollers with which each movable channel-cheek is provided, to the end of drawing same toward a magnet designed to hold it in open position until engaged by the closer-cam.

Advantages provided by the invention are: simpler design, reduced overall dimensions, and enhanced reliability in terms of function.

An embodiment of the invention will now be described—by way of example—with the aid of the five sheets of drawings attached, in which:

FIG. 2 is a view of FIG. 1 from above, partly in section-through;

FIG. 4 is a detail of the tomato-infeed area, seen on larger scale and in part-section;

FIG. 5 is a detail of the area where skinned tomatoes make their exit—seen on larger scale and in part-section;

Figure 1:
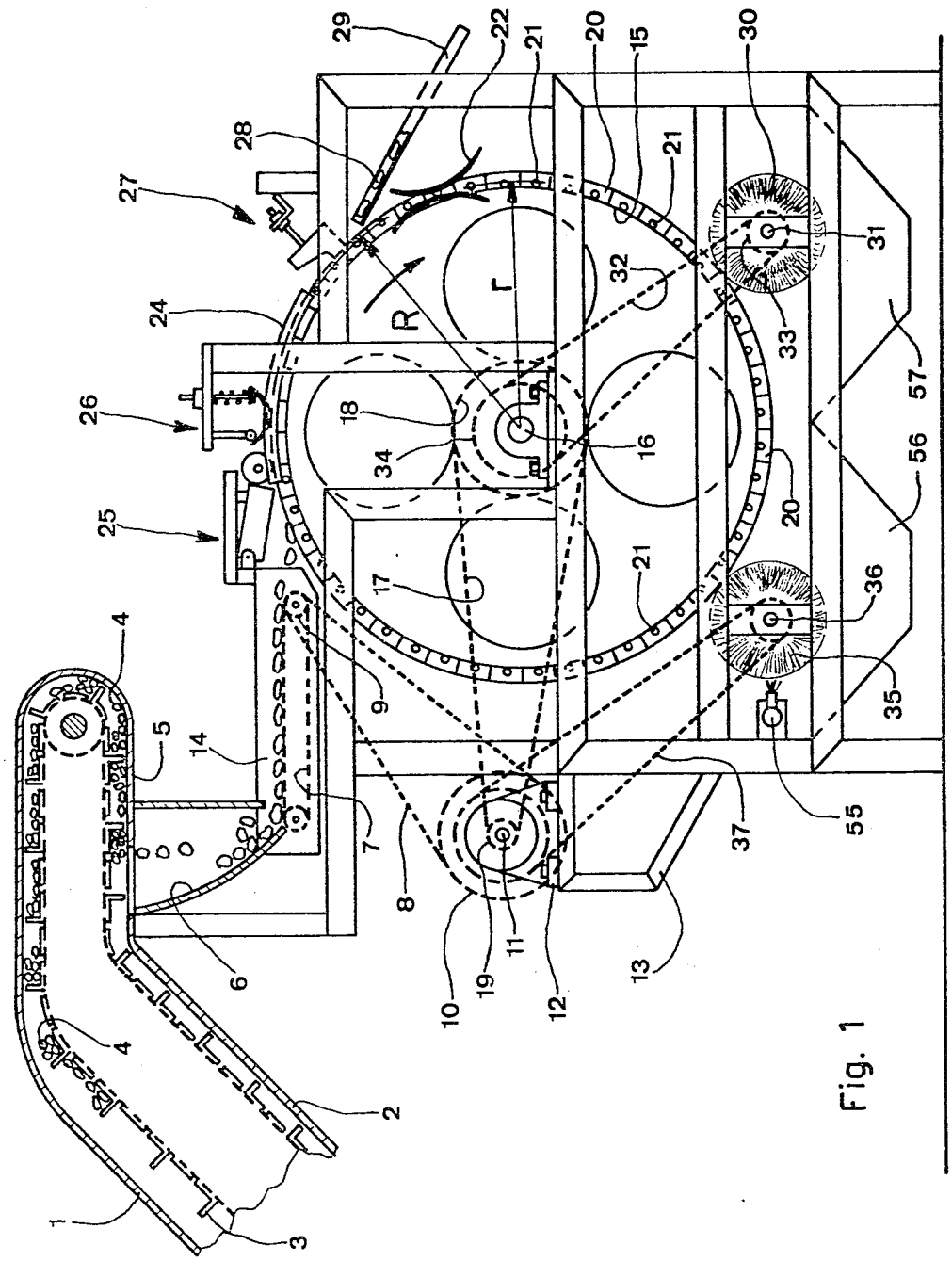
FIG. 1 is a side view of the machine.
Figure 2:
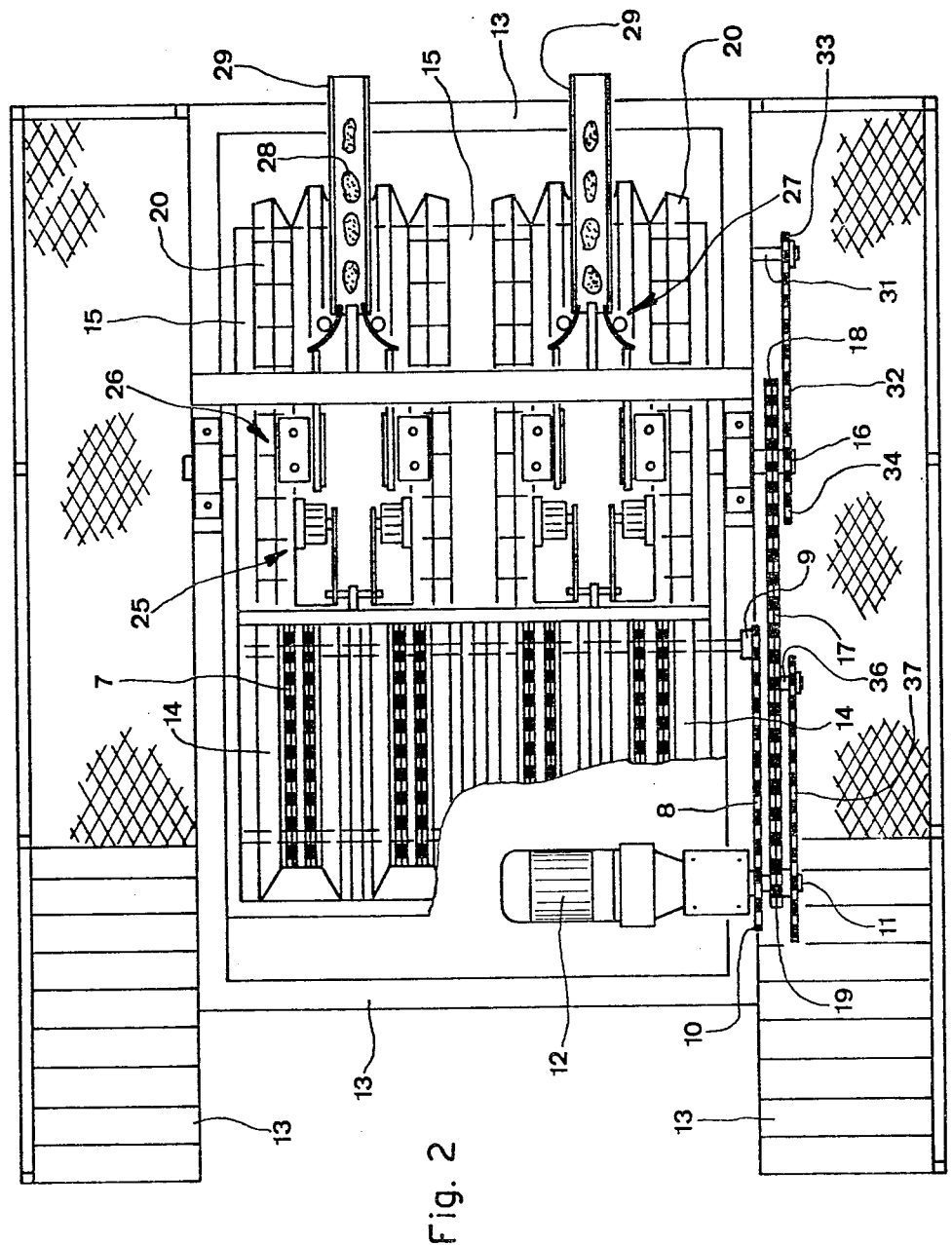

With reference to the drawings: 1 denotes the outer casing of a lift unit bearing up and at the same time enveloping a conveyor-belt 2 provided with rungs, or ribs 3 for the purpose of carrying forward tomatoes 4 to be peeled; 5 denotes a lower horizontal return-stretch of outer-casing 1 thus embodied so as to produce a smoother and more ordered flow of tomatoes to the dispenser-hopper 6—this shaped with channels corresponding to the actual peeler-lines—and from thence to the set of accelerator-chains 7 located thereneath and driven by a chain 8 looped around sprockets 9 and 10, the latter of which keyed onto a shaft 11 turned by motorvariator 12 fixed to framework 13 by means of which outer-casing 1 aforesaid, and the side-members 14 housing chains 7 are also supported.

15 denotes the drum keyed onto a shaft 16 mounted in rotation to framework 13, rotation being duly imparted thereto by a chain 17 looped around sprockets 18 and 19, the latter of which keyed onto shaft 11 aforesaid; a series of oscillating channel-cheeks are denoted by 20, each one of which hinged to and peripherally about drum 15 and provided with a outer roller or articulated joint 21 whose centrally-oriented generatrix lies, initially, concurrent with that circumference as described by radius R, this last being marginally greater than radius r with which the surface of said roller comes into concurrence following its enforced passage through a deflector 22 affixed to framework 13—this for the purpose of allowing the channel-cheek to be drawn toward a relative magnet 23 affixed to the drum peripheral surface to hold channel-cheeks 20 in the open position.

24 denotes cam profiles mounted flexibly to framework 13 at a point immediately behind device 25 designed to perforate of as yet unskinned tomatoes 4, the cam serving to urge channel-cheeks 20 into closed position whereby tomato-pulp is expelled from the skin covering—the cutter-device 25 mounted to framework 13. A shoe 26—likewise fitted to framework 13—is designed to exert sufficient downward pressure as will prevent tomato-pulp from shooting away while being directed into the discharge, or exit channel.

27 denotes a bottle-neck device which channels skinned tomatoes 28 into the exit-chute 29, both components 27 & 29 mounted to framework 13. A set of spinning brushes 30 for cleaning off shed tomato-peel is keyed onto a shaft 31 mounted in rotation to framework 13, and driven thus by a chain 32 looped around sprockets 33 and 34, the latter of which keyed onto shaft 16; another set of brushes similar to set 30 is denoted by 35, giving an additional cleaning to both the movable and fixed channel-cheeks as well as to the exit-channel lying between the latter (fixed) cheeks; brushes 35 are likewise keyed to a shaft 36 receiving drive from motor-variator 12 by way of shaft 11 and chain 37.

Figure 3:
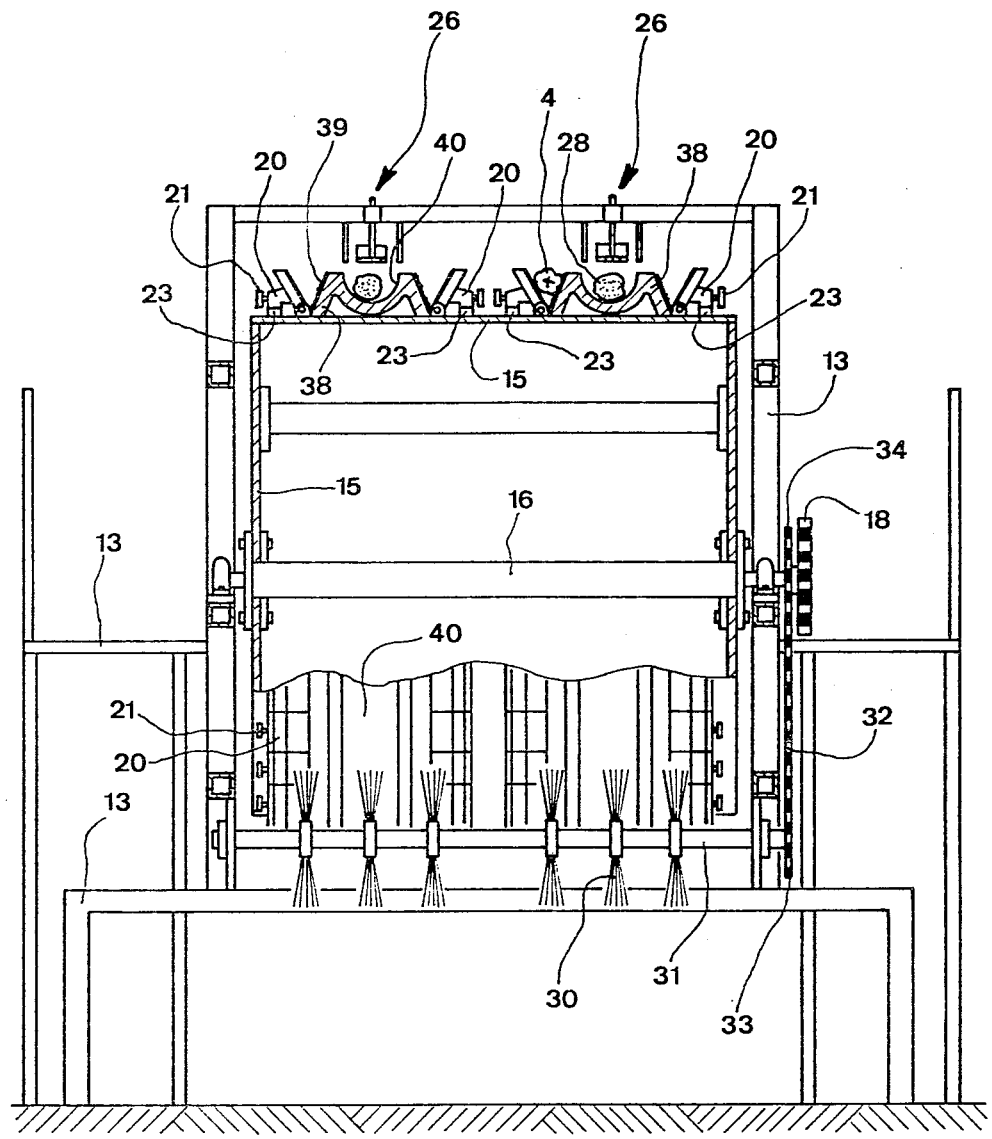
FIG. 3 is a further part-sectional view, taken from the right-hand side.

38 denotes a profiled hoop—either metallic or plastic, or even rubber material—fitted to the drum perimeter 15 and positioned between each pair of movable channel-cheeks 20, said hoop exhibiting a pair of sloping flank-walls (see FIG. 3) denoted 39 and faced outward in such a way as to create the fixed channel-cheeks aforementioned.

40 denotes the exit-channel or gulley lying between said fixed cheeks or flank-walls 39 which takes up and directs skinned tomatoes 28 during the stage wherein movable channel-cheek 20 is drawn angularly toward its corresponding channel flank-wall 39, or in other words, its fixed cheek.

41 (in FIG. 4) denotes a revolving tracer-wheel with serrated, or toothed edge, which forms part of that cutter device 25 aforesaid designed to puncture and open up the tomato-skin, said wheel turning at the end of a rocker 42 hinged to a mounting 43 planted on framework 13; 44 denotes a spring designed to maintain tracer-wheel 41 urged downward in cutter device 25 itself.

A curved flexible shoe 45 hinged to an appropriate mount 46 fastened to framework 13, is urged downward with convex face at bottom by the agency of a spring 47 constituting a part of the presser-shoe device 26.

48 denotes a pair of converging elements making up the bottleneck device 27 aforesaid, whilst 49 denotes a pair of threaded adjuster-rods for setting both angle and height of said pair of elements 48.

Figure 6:
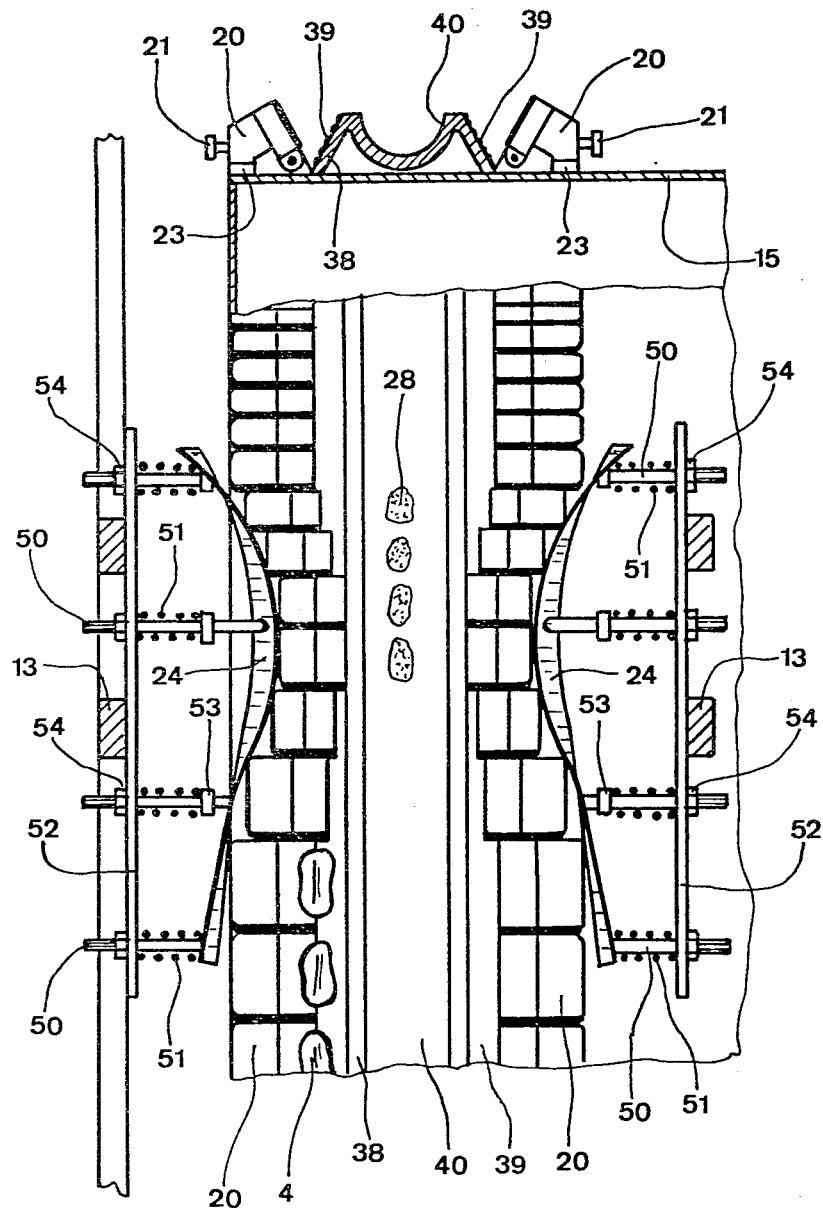
FIG. 6 shows the device whereby movable channel-cheeks are closed, seen on larger scale and in part-section.

50 (FIG. 6) denotes a set of threaded adjuster-rods attached to each cam-profile 24 for the purpose of setting the latter's transverse position in flexible fashion by way of springs 51 whose outer ends sit against an appendage-rail 52 of framework 13 and whose inner ends sit against a collar 53 with which each of rods 50 is furnished, said rods able to slide within corresponding holes located in rail 52 aforesaid and fitted further with adjust-nuts 54 for desired positioning thereof.

55 denotes spray-nozzles for washing off channels and gulleys, whilst basins 56 and 57 collect up and discharge fluid matter and shed tomato-skins—the latter remaining stuck in the main to the fixed channel-cheek, which is milled appropriately to the end of holding them thus.

The machine functions as follows:

Tomatoes 4 to be peeled are brought up on ribs 3 of the conveyor and pass along bottom stretch 5 of lift-casing 1, dropping into dispenser-hopper 6 in order to be lined up and spaced apart on accelerator chains 7.

The tomatoes 4 then flop from accelerator chains 7 onto a respective peeling-line proper, coming to rest between fixed and movable channel-cheeks 20 on rotating drum 15.

Rotation of drum 15 then causes movable channel cheeks 20 to slide on flexible cam-profile 24 which brings about a gradual angular displacement of the movable channel-cheeks 20 toward the fixed cheeks 39, overcoming the attractive force of magnet 23.

The tomatoes 4 are held fast between the fixed and movable channel-cheeks allowing serrated tracer-wheel 41 of cutter device 25 to perforate and weaken the outer skin. The perforated tomatoes are then squeezed so that the skin breaks open completely and pulp 28 is ejected into gulley 40 lying between the fixed-cheeks 39.

Flexible shoe 26 prevents any unwarranted upward movement of larger tomatoes thusly skinned, while bottleneck guide 27—consisting of a symmetrical pair of narrowing elements centered upon gulley 40—directs the peeled tomato-pulp 28 into the exit chute 29.

After having squeezed tomatoes 4, movable channel-cheeks 20 continue to slide on the flexible cam-profile 24 moving away from fixed cheeks 39 and then meet with deflector device 22. This device deflects movable channel-cheek rollers 21 toward the drum center, moving them from a circumference having radius R to another circumference having a smaller radius r: thus the movable channel cheeks 20—whose outer surface is embodied in ferromagnetic material—are open completely and are pushed toward the outer surface of respective magnets 23 which then hold the channel-cheeks in the open position until they meet again with flexible cam-profile 24.

When carrying the invention into effect, materials employed, effective dimensions and constructional details may all differ from those described thus far, without by any means straying from within bounds of protection afforded to the design as claimed herein—such differences remaining technically equivalent in terms of the art.

Furthermore, the magnetic contrivance by means of which movable channel-cheeks 20 are held open may be replaced—not to advantage it must be said—with traditional springs, and the roller 21 in this event replaced by a ball-joint.

Moreover, the assembly comprising fixed flank-walls 39 and gulley 40 may be fashioned either in metal or from plastic material—in the latter case dispensing with the need for a milled or knurled covering for the fixed cheeks, as the hoop wherein flanks 39 and gulley 40 are embodied could be moulded at the outset with milled outer surfaces.

Again, the lift 3 & 5 and dispenser-hopper 6 could be differently embodied, as could chains 7; and lastly, the tracer-wheel in device 25 with its cutting edge might turn idle on its own axis, or be driven by way of a motor and appropriate means of transmission (e.g. belt) located on its sprung carrier.

I claim:

1. A rotating-drum machine for peeling tomatoes or the like, comprising: a rotating drum including twin-cheeked channels defined by a movable cheek and a fixed cheek disposed peripherally about said drum; means for conveying unpeeled tomatoes into the channels; a cutter device having a revolving serrated tracer-wheel mounted to perforate skins of said tomatoes; cam means for gradually drawing said cheeks together to gently and gradually squeeze and separate pulp from the perforated skin, the cam means working in opposition to a magnet means for holding the cheeks apart, the magnet means being located between an outer surface of said drum and an outer surface of the movable channel-cheek, wherein said movable channel-cheek is mounted to oscillate during contact with the cam means and includes a roller on an outer face thereof; a deflector device mounted to contact the roller subsequent to ejection of the peeled tomato from the channels and discharge thereof down an exit-chute, said deflector fixedly located to move said roller from a position concurrent with one circumference imposed by radius R to a position concurrent with that imposed by smaller radius r, thereby opening the movable channel-cheek; the magnet means affixed to the outer surface of said rotating drum for retaining the movable cheek in open position.

2. Rotating-drum machine according to claim 1, wherein said cam means is a flexible camprofile operable to overcome a force exerted by the magnet means on the movable channel-cheek, said cam mounted to a fixed longitudinal rail on transverse rods slideable through said rail, and a spring carried on each rod between said camprofile and said fixed rail.

3. Rotating-drum machine according to claim 1, further including a gulley mounted laterally adjacent each said pair of channel-cheeks, and a presser-shoe device fixedly located directly above said gulley downstream of said cutter-device to prevent pulp from being thrown out of the gulley, said pressure shoe device including a shoe presenting a convex surface toward the drum, one end of the shoe hinged to an appendage of a machine frame, the other end of the shoe being radially movable by means of a spring ensheathing a plunge-rod supporting the other end.

4. Rotating-drum machine according to claim 3, further including a bottle-neck device located above said galley downstream from said shoe-device, and upstream from the exit-chute, said bottle-neck device operable to discharge peeled tomatoes from the machine and including a pair of forwardly-converging longitudinal elements interconnected at upper ends thereof to a threaded rod securing the bottle-neck device to a machine frame.

5. Rotating-drum machine according to claim 2, further including a profiled hoop element fitted circumferentially to said drum between adjacent oscillating channel-cheeks to define a central gulley therebetween having a pair of outer lateral sloping flank-walls forming fixed channel-cheeks mounted in opposition to a movable channel cheek.

6. A machine for peeling tomatoes and the like, comprising:
  (a) a rotating drum having a movable member and a fixed member extending peripherally about the drum to define a peeling channel therebetween;
  (b) means for successively conveying unpeeled tomatoes into the peeling channel between the movable and fixed members;
  (c) profiled cam means mounted to gradually deflect the movable member from an open position towards the fixed members during progressive rotation of the member on the drum;
  (d) means mounted to perforate the skin of a tomato in the peeling channel as the movable member is initially deflected toward the fixed member to hold the tomato in the channel;
  (e) exit channel means located adjacent the peeling channel to receive pulp gently squeezed and separated from the tomato skin as the profiled cam means gradually urges the movable member against the fixed member, said exit channel means including an exit chute discharging pulp from the machine; and
  (f) means mounted to deflect the moveable member to the open position.

* * * * *